US008108188B2

(12) United States Patent
Johnson

(10) Patent No.: US 8,108,188 B2
(45) Date of Patent: Jan. 31, 2012

(54) ENUMERATED LINEAR PROGRAMMING FOR OPTIMAL STRATEGIES

(75) Inventor: Daniel P. Johnson, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 611 days.

(21) Appl. No.: 12/261,616

(22) Filed: Oct. 30, 2008

(65) Prior Publication Data

US 2010/0114541 A1 May 6, 2010

(51) Int. Cl.
*G06F 17/50* (2006.01)
(52) U.S. Cl. .......................................................... 703/6
(58) Field of Classification Search ................... 703/6
See application file for complete search history.

(56) References Cited

U.S. PATENT DOCUMENTS 7,315,801 B1 * 1/2008 Dowd et al. ..................... 703/13

OTHER PUBLICATIONS

Jain et al., "Bayesian Stackelberg Games and their Application for Security at Los Angeles International Airport", "ACM SIGecom Exchanges", 2008, vol. 7, No. 2, Publisher: ACM.
Paruchuri, Praveen, "Keep the Adversary Guessing: Agent Security by Policy Randomization", "Dissertation", May 2007, pp. 1-119, Publisher: University of Southern California, Published in: California.

Paruchuri et al., "Playing Games for Secuirty: An Efficient Exact Algorithm for Solving Bayesian Stackelberg Games", "Proceedings of 7th International Conference on Autonomous Agents and Multiagent Systems", May 2008, pp. 895-902, Publisher: International Foundation for Autonomous Agents and Multiagent Systems.
Pita et al., "Deployed ARMOR Protection: The Application of a Game Theoretic Model for Security at the Los Angeles International Airpo", "Proceedings of the 7th International Joint Conference on Autonomous Agents and Multiagent Systems", 2008, pp. 125-132, Publisher: International Foundation for Autonomous Agents and Multiagent Systems.
Tambe et al., "Security via Strategic Randomization", Dec. 31, 2007, pp. 1-4, Publisher: USC Create Homeland Security Center, Published in: California.

* cited by examiner

*Primary Examiner* — Dwin M Craig
(74) *Attorney, Agent, or Firm* — Ingrassia Fisher & Lorenz, P.C.

(57) ABSTRACT

One embodiment is directed to an approach to solving a leader-follower problem in which a leader has a set of leader actions and a follower has a set of follower actions. The approach includes receiving an expression of the leader-follower problem as a normal form Stackelberg game. The approach further includes, for each possible follower action, solving a linear program (LP) problem to determine a respective optimal mixed leader strategy, wherein the LP problem optimizes a leader payoff for a given mixed leader strategy and a given fixed follower action over a feasible region that includes only mixed leader strategies that provoke that respective follower action. The approach further includes generating an output derived from the optimal mixed leader strategies, and outputting the output by changing a physical state associated with an interface.

20 Claims, 2 Drawing Sheets

ENUMERATED LINEAR PROGRAMMING FOR OPTIMAL STRATEGIES

BACKGROUND

One class of problem involving multiple-adversarial agents (such as security problems) can be formulated as a defender-attacker game in which a first intelligent agent (also referred to here as the "defender") will use limited defensive resources to protect against an attack by a second intelligent adversary (also referred to here as the "attacker") that uses limited offensive resources.

The game theoretic features of such a game are that the attacker gets to observe the defender's mixed strategy over a period of observation before committing to an attack. The attacker chooses a means of attack without knowing the defender's strategy for the day of the attack. The rewards are not zero-sum or symmetric. For example, a convoy protection problem can be formulated as a defender-attacker game in which the defender varies its choice of possible routes and the attacker chooses an ambush site based on its observations of the routes chosen by the defender.

Such defender-attacker games are often modeled as Stackelberg games. The Decomposed Optimal Bayesian Stackelberg Solver (DOBSS) is described in Paruchuri, P., J. Pearce, and S. Kraus, "Playing Games for Security: An Efficient Exact Algorithm for Solving Bayesian Stackelberg Games", Proc. of 7tha Int. Conf. on Autonomous Agents and Multiagent Systems (AAMAS 2008), ed. by Berger, Burg, and Nishiyama, May 12-16, Estoril, Portugal, 2008, which is referred to here as the "Paruchuri Article" and which is hereby incorporated herein by reference. In the DOBSS approach, a mixed-integer linear program (MILP) is formulated for a defender-attacker game for which the various attacks and defenses can be enumerated. The MILP problem is solved to find optimal mixed strategies for the defender-attacker game.

For example, Table 1 shows a normal form Stackelberg game for a simple leader-follower problem in which the leader comprises a defender and the follower comprises an attacker.

TABLE 1

Simple Normal Form Game

|   | C    | D    |
|---|------|------|
| A | 2, 1 | 4, 0 |
| B | 1, 0 | 3, 2 |

Where:
$i \in I$ Defender's strategy
$j \in J$ Attacker's strategy
$R_{ij}$ Reward to defender under defense i and attack j
$c_{ij}$ Reward to attacker under defense i and attack j
$x_i \in [0,1]$ Fraction of occasions that defender will choose i
$q_j \in 0,1$ $q_j=1$ if chosen attack is j, else $q_j=0$ In this example, the defender chooses a "mixed" defender strategy. As used herein, a "strategy" refers to a set of "actions" taken by a particular agent. For example, a mixed leader strategy refers to a set of actions taken by the leader, where the various leader actions need not all be the same. More formally, the mixed strategy is expressed as $0 \leq x_i \leq 1$.

The defender tries to maximize its strategy, knowing that the attacker will choose its best attack against whatever mixed defense the defender picks. This can be formularized in Equation (1).

$$\max_x \sum_i \sum_j R_{ij} x_i q_j \qquad (1)$$

$$\text{s.t.} \quad q = \mathrm{argmax}_q \sum_i \sum_j c_{ij} x_i q_j$$

$$\sum_i x_i = 1$$

$$\sum_j q_j = 1$$

$$\forall i \; 0 \leq x_i \leq 1$$

$$\forall j \; q_j \in \{0, 1\}$$

Using the approach described in the Paruchuri Article, it is possible to convert Equation (1) into a Mixed Integer Quadratic Program (MIQP) as shown in Equation (2) by taking advantage of standard optimality conditions for the inner optimization problem.

$$\max_{x,q,a} \sum_i \sum_j R_{ij} x_i q_j \qquad (2)$$

$$\text{s.t.} \quad \forall j \; 0 \leq \left(a - \sum_i c_{ij} x_i\right) \leq (1-q)M$$

$$\sum_i x_i = 1$$

$$\sum_j q_j = 1$$

$$\forall i \; 0 \leq x_i \leq 1$$

$$\forall j \; q_j \in \{0, 1\}$$

$$0 \leq a \leq M$$

where M is a large constant such that:

$$M \gg \max_j \sum_i c_{ij} \qquad (3)$$

A dual objective a of the inner problem can be defined for Equation (2), which means that for a solution x,q,a we will have $a = \max_j \sum_i c_{ij} x_i$.

Using the approach described in the Paruchuri Article, the problem defined in Table 1 can be expressed using Equation (2) to get the system of equations as follows (where M=3 to satisfy Equation (3)).

$$\max_{x_1,x_2,q_1,q_2,a} \; 2x_1 q_1 + 4x_1 q_2 + x_2 q_1 + 3x_2 q_2 \qquad (4)$$

$$\text{s.t.} \quad 0 \leq a - x_1 \leq 3(1-q_1)$$

$$0 \leq a - 2x_2 \leq 3(1-q_2)$$

$$x_1 + x_2 = 1$$

$$q_1 + q_2 = 1$$

$$0 \leq x_1, x_2 \leq 1$$

$$q_1, q_2 \in \{0, 1\}$$

$$0 \leq a \leq 3$$

The optimal solution to Equation (4) is $x_1=2/3$; $x_2=1/3$; $q_1=0$; $q_2=1$; $a=2/3$. The strategy results in a payoff to the attacker of 2/3 and a payoff to the defender of 11/3.

The next stage in the approach described in the Paruchuri Article is to linearize the MIQP of Equation (2). This is done by defining the variables $\{z_{ij}\}$ where:

$$z_{ij} = x_i q_j \quad (5)$$

$$x_i = \sum_j z_{ij} \quad (6)$$

The resulting Mixed Integer Linear Program is as follows:

$$\max_{z,q,a} \sum_i \sum_j R_{ij} z_{ij} \quad (7)$$

$$\text{s.t. } \forall j \, 0 \leq \left(a - \sum_i c_{ij}\left(\sum_h z_{ih}\right)\right) \leq (1-q_j)M$$

$$\sum_i \sum_j z_{ij} = 1$$

$$\sum_j q_j = 1$$

$$\forall i \sum_j z_{ij} \leq 1$$

$$\forall j \, q_j \leq \sum_i z_{ij} \leq 1$$

$$\forall ij \, 0 \leq z_{ij} \leq 1$$

$$\forall j \, q_j \in \{0,1\}$$

$$0 \leq a \leq M$$

where M is a large constant satisfying Equation (3).

The problem defined in Table 1 can be expressed using Equation (7) to get the following system of equations (where M=3 to satisfy Equation (3)).

$$\max_{z_{11},z_{12},z_{21},z_{22},q_1,q_2,a} \; 2z_{11} + 4z_{12} + z_{21} + 3z_{22} \quad (8)$$

$$\text{s.t. } 0 \leq a - z_{11} - z_{12} \leq 3(1-q_1)$$

$$0 \leq a - 2z_{21} - 2z_{22} \leq 3(1-q_2)$$

$$z_{11} + z_{12} + z_{21} + z_{22} = 1$$

$$q_1 + q_2 = 1$$

$$z_{11} + z_{12} \leq 1$$

$$z_{21} + z_{22} \leq 1$$

$$q_1 \leq z_{11} + z_{12} \leq 1$$

$$q_2 \leq z_{12} + z_{22} \leq 1$$

$$0 \leq z_{11}, z_{12}, z_{21}, z_{22} \leq 1$$

$$q_1, q_2 \in \{0,1\}$$

$$0 \leq a \leq 3$$

The optimal solution to this system of Equations (8) is $z_{11}=z_{21}=0$, $z_{12}=2/3$, $z_{22}=1/3$, $q_1=0$, $q_2=1$, $a=2/3$. The strategy results in a payoff to the attacker of 2/3 and a payoff to the defender of 11/3.

However, solving the MILP problem that results from the DOBSS approach described in the Paruchuri Article can be cumbersome and computationally intensive for real-word applications.

SUMMARY

One embodiment is a method of solving a leader-follower problem in which a leader has a set of leader actions and a follower has a set of follower actions. The method includes receiving an expression of the leader-follower problem as a normal form Stackelberg game. The method further includes, for each possible follower action, solving a linear program (LP) problem to determine a respective optimal mixed leader strategy, wherein the LP problem optimizes a leader payoff for a given mixed leader strategy and a given fixed follower action over a feasible region that includes only mixed leader strategies that provoke that respective follower action. The method further includes generating an output derived from the optimal mixed leader strategies, and outputting the output by changing a physical state associated with an interface.

Another embodiment is a system for solving a leader-follower problem in which a leader has a set of leader actions and a follower has a set of follower actions. The system includes at least one programmable processor and at least one interface to receive information about the leader-follower problem. The programmable processor is configured to execute software that is operable to cause the system to receive an expression of the leader-follower problem as a normal form Stackelberg game. The software is further operable to cause the system to, for each possible follower action, solve a linear program (LP) problem to determine a respective optimal mixed leader strategy, wherein the LP problem optimizes a leader payoff for a given mixed leader strategy and a given fixed follower action over a feasible region that includes only mixed leader strategies that provoke that respective follower action. The software is further operable to cause the system to generate an output derived from the optimal mixed leader strategies, and output the output by changing a physical state associated with the interface.

Another embodiment is a program product for solving a leader-follower problem in which a leader has a set of leader actions and a follower has a set of follower actions. The program-product includes a processor-readable medium on which program instructions are embodied. The program instructions are operable, when executed by at least one programmable processor included in a device, to cause the device to receive an expression of the leader-follower problem as a normal form Stackelberg game. The program instructions are further operable, when executed by at least one programmable processor included in the device, to cause the device to, for each possible follower action, solve a linear program (LP) problem to determine a respective optimal mixed leader strategy, wherein the LP problem optimizes a leader payoff for a given mixed leader strategy and a given fixed follower action over a feasible region that includes only mixed leader strategies that provoke that respective follower action. The program instructions are further operable, when executed by at least one programmable processor included in the device, to cause the device to generate an output derived from the optimal mixed leader strategies, and output the output by changing a physical state associated with an interface.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
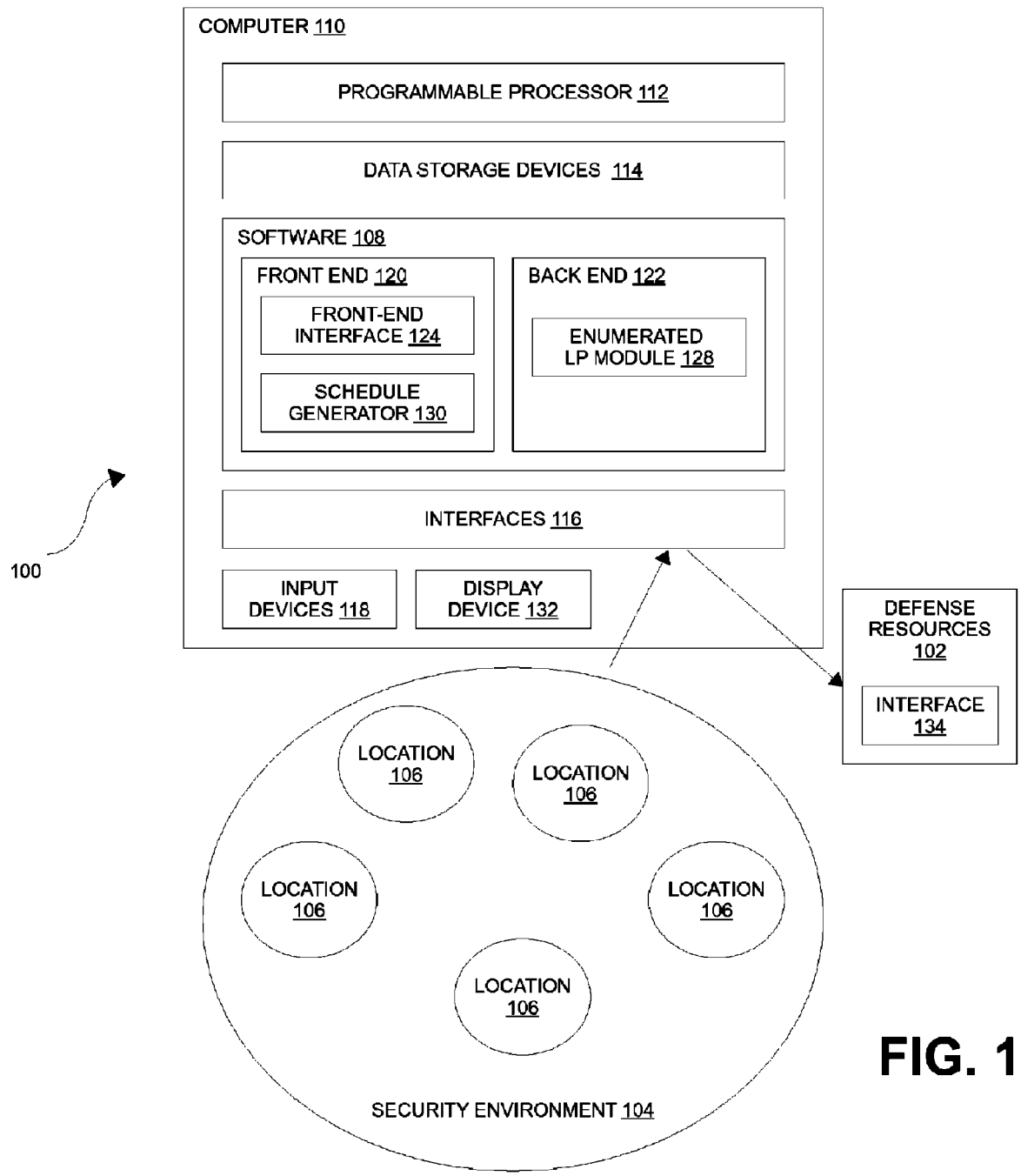
FIG. 1 is a block diagram of one embodiment of a system that is operable to define and solve leader-follower games using the techniques described in connection with FIG. 2.

FIG. 1 is a block diagram of one embodiment of a system 100 that is operable to define and solve leader-follower games using the techniques described below in connection with FIG. 2. The system 100 outputs a mixed strategy for the leader (also referred to here as a "mixed leader strategy"). In the particular embodiment described, each mixed leader strategy comprises, for each of the set of leader actions, a respective fraction of occasions that the leader is to choose that respective leader action.

Figure 2:
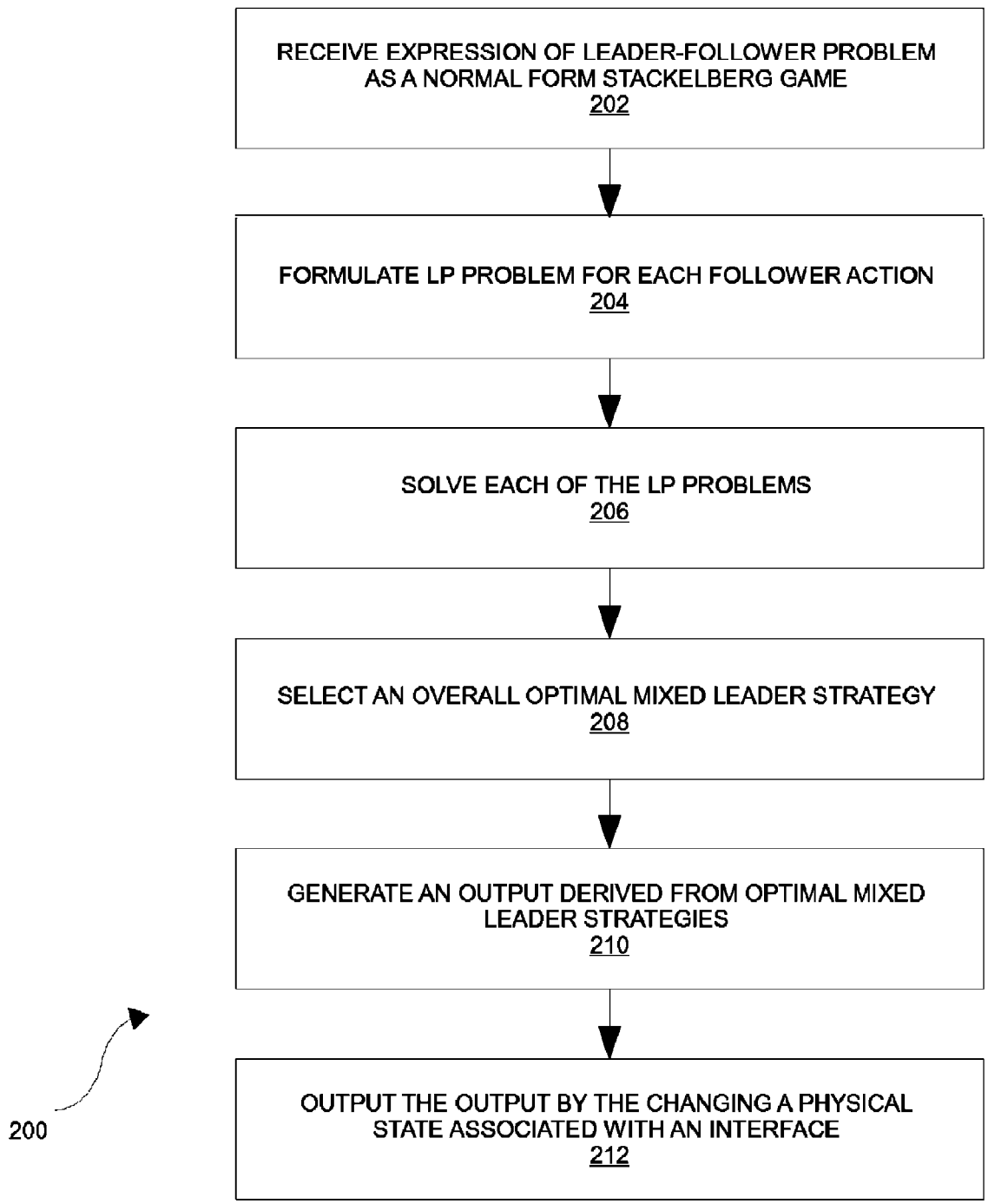
FIG. 2 is a flow diagram of one embodiment of a method of solving a leader-follower problem.

In the particular embodiment described here in connection with FIGS. 1 and 2, the leader-follower game comprises a defender-attacker game in which the leader comprises the defender and the follower comprises the attacker. System 100 is used to output a mixed defender strategy that indicates how limited defense resources 102 available to the defender can be deployed within a given security environment 104 to defend against attacks from the attacker.

In this particular embodiment, the limited defense resources 102 comprise a group of vehicles (for example, trucks, sea ships, or air planes) that travel together in a convoy for mutual support and defense. Each convoy takes a particular path that travels through a set of locations 106. The system 100, in such an embodiment, is used to output a suggested convoy schedule that indicates, for each possible path the convoy could take, a respective fraction of occasions that the defender is to choose that path.

Although the embodiment shown in FIG. 1 is described here as being used to output a convoy schedule, it is to be understood that in other embodiments, other types of defensive strategies are output. More generally, the systems and techniques described here can be used to develop strategies for dealing with leader-follower games that can be modeled as Stackelberg games for which the actions by the leader and the follower can be enumerated. For example, in other embodiments, strategies relating to defending critical infrastructure resources such as electric power grids, subways, or airports are output.

The system 100 is described here as being implemented as software 108 that executes on one or more computers 110 (though it is to be understood that the system 100 can be implemented using various combinations of hardware and software). In the particular embodiment shown in FIG. 1, the software 108 is executed by at least one programmable processor 112 (for example, at least one general-purpose microprocessor or central processor) included in the computer 110. The software 108 comprises a set of program instructions embodied on a storage medium from which at least a portion of the program instructions are read by the programmable processor 112 for execution thereby. The program instructions, when executed by the programmable processor 112, carry out at least a portion of the functionality described here as being performed by the system 100.

In such an embodiment, the processor 112 includes or is communicatively coupled to at least one data storage device 114 for storing such program instructions and/or data used during execution of the software 108. Examples of suitable data storage devices 114 include any suitable form of volatile memory (such as random-access memory and registers included within programmable processors) and/or non-volatile memory (such as nonvolatile RAM memory, magnetic disc drives, and optical disc drives). Although only a single data storage device is shown in FIG. 1, it is to be understood that multiple data storage device can be used.

One or more interfaces 116 are included in the system 100 to capture information related to the security environment 104 and/or other input used by the processor 112 (and the software 108 executed thereon). Moreover, although only a single interface 116 is shown in FIG. 1, it is to be understood that multiple interfaces (for example, different types of interfaces) can be used.

For example, one or more interfaces 116 are used to communicatively couple one or more input devices 118 to the processor 112. A user is able to provide input to the processor 112 (and the software 108 executing thereon) using such input devices 118. In the embodiment shown in FIG. 1, the input devices 118 comprise a keyboard and a pointing device (such as a mouse or a touch-pad). In some implementations of the embodiment shown in FIG. 1, the computer 110 includes one or more interfaces by which external input devices are communicatively coupled to the computer 110. In other implementations (for example, where the computer 110 comprises a portable computer), the keyboard and the pointing device are integrated into the computer 110. In some of those implementations, a keyboard and/or pointing device external to the portable computer can also be communicatively coupled to the computer 110.

Input to the processor 112 (and the software 108 executing thereon) can be supplied in other ways, for example, from a network (such as a local or wide area network), one or more data files or other data stores (such as databases), or "real time" data from sensors (or other sources of data relating to the security environment 104).

In the particular embodiment shown in FIG. 1, the software 108 comprises a front end 120 and a back end 122. The front end 120 comprises a front-end interface 124 via which a user is able to enter a payoff table (also referred to here as a "reward matrix" or "game matrix"). The payoff table specifies the leader payoff and the follower payoff for each combination of a possible leader action and a possible follower action. In the particular embodiment described here in connection with FIGS. 1 and 2, the leader actions are the possible convoy paths and the follower actions are the possible locations for attacks on a convoy. The payoff table, in such an embodiment, identifies the payoff to the defender and the payoff to the attacker for each combination of a convoy path and a location for an attack on the convoy.

In one implementation, the front-end interface 124 is implemented as a user interface (displayed on a display device 132 (described below)) via which a user can manually input such data using an input device 114. In other implementations, the front-end interface 124 is used to receive such data in other ways (for example, by receiving a file in which such data is entered).

The back end 122 comprises an enumerated linear programming (LP) module 128 to generate a set of optimal mixed leader strategies for the leader-follower problem using the method described below in connection with FIG. 2.

In the particular embodiment described here in connection with FIG. 1, each mixed leader strategy comprises, for each of the set of leader actions, a respective fraction of occasions that the leader is to choose that respective leader action. More specifically, each mixed leader strategy indicates, for each possible path for the convoy, a respective fraction of occasions that the defender is to take that path.

In the particular embodiment shown in FIG. 1, the front end 120 comprises a schedule generator 130. The schedule generator 130 generates a suggested convoy schedule from the front end's knowledge of the defense resources 102 and the security environment 104 combined with an optimal mixed leader strategy output by the back end 122. This suggested convoy schedule can be adjusted manually as necessary to produce a finalized schedule.

In one implementation of the system 100, at least a portion of the suggested convoy schedule is communicated (via an appropriate interface 116) to a display device 132 for display thereon (for example, using a web browser or other user interface mechanism). Such display device 132 may be local to the system 100 (for example, where a video monitor is coupled directly to a video port of the computer 110 used to implement the system 100) or may be remote to the system 100 (for example, where the display device 132 is a part of or connected to a client computer that remotely accesses the one or more computers 108 used to implement the system 100 over a network such as Internet using appropriate client and server software, in which case the interface 118 comprises an appropriate network interface). In another example, at least a portion of such an output may be communicated via an appropriate interface 116 to an interface 134 associated with the defense resources 102 in order to cause a defense-related action to be taken (for example, communicating a command to a system or device within the defense resources 102 over a network or other communication link that causes the system or device to take some action based on the command). More generally, it should be understood that the output generated by the system 100 is used to (among other things) change the state of the interface 116 (for example, changing the state of the various signals that make up the interface) and any device or interface communicatively coupled thereto (such as display device 132 and interface 134).

FIG. 2 is a flow diagram of one embodiment of a method 200 of solving a leader-follower problem. Method 200 is based on a new and novel approach to solving such problems which is provably polynomial in the size of the normal form Stackelberg game. This approach is based on the following. The convex set of all legitimate mixed defensive strategies is defined as:

$$X = \left\{ x: \sum_i x_i = 1, \forall i 0 \le x_i \right\} \quad (9)$$

The inner optimization problem in Equation (1) can then be pulled out to define the optimal attack function, which computes the best attack given a mixed defender strategy:

$$q(x) = \operatorname{argmax}_q \left\{ \sum_i \sum_j c_{ij} x_i q_j : \sum_j q_j = 1, \forall j 0 \le q_j \right\} \quad (10)$$

It can be shown that for $x \in X$, an optimal $q(x)$ that will be one for some $\hat{j}$ and zero for all other $j$. Thus, the following can be defined:

$$\hat{q}(x) = \operatorname{argmax}_j \left\{ \sum_i c_{ij} x_i \right\} \quad (11)$$

And, without loss of generality, Equation (10) can be redefined as:

$$q(x)_j = \begin{cases} 0 & \text{if } j \ne \hat{q}(x) \\ 1 & \text{if } j = \hat{q}(x) \end{cases} \quad (12)$$

Also, X is then decomposed into those subregions that result in a particular attack response:

$$X_j = \{ x \in X : \hat{q}(x) = j \} \quad (13)$$

Note that by definition of Equation (11), each $X_j$ must be a linear polytope defined by:

$$X_j = \left\{ x \in X : \forall \hat{j} \sum_i c_{ij} x_i \le \sum_i c_{ij} x_i \right\} \quad (14)$$

Therefore, the problem expressed in Equation (1) can be re-expressed in the form:

$$\max_x \left\{ \sum_{ij} R_{ij} x_i q(x)_j : x \in \bigcup_j X_j \right\} \quad (15)$$

$$\Leftrightarrow \max_{x,j} \left\{ \sum_{ij} R_{ij} x q(x)_j : x \in X_j \right\}$$

$$\Leftrightarrow \max_{xj} \left\{ \sum_i R_{ij} x_i : x \in X_j \right\}$$

where the last equivalence comes from Equation (12).

As a result of Equations (15), we can rewrite Equation (1) as an equivalent problem:

$$\max_j \max_x \sum_i R_{ij} x_i \quad (16)$$

$$\text{s.t. } \forall \hat{j} \sum_i c_{ij} x_i \le \sum_i c_{i\hat{j}} x_i$$

$$\sum_i x_i = 1$$

$$\forall i 0 \le x_i$$

As a result, the original leader-follower problem of Equation (1) can be rewritten as |J| linear programs, each with |I| variables, and |J|+|I|+1 constraints.

This approach is used in method 200. The particular embodiment of method 200 shown in FIG. 2 is described here as being implemented in the software 108 of system 100 of FIG. 1. In this embodiment, the leader-follower game comprises a defender-attacker game and the system 100 is used to output a suggested convoy schedule that indicates, for each possible path the convoy could take, a respective fraction of occasions that the convey (that is, the defender) is to choose that path.

Method 200 comprises receiving an expression of the leader-follower problem as a normal form Stackelberg game (block 202). In the particular embodiment described here in connection with FIGS. 1 and 2, a normal form Stackelberg game that models the defender-attacker problem addressed in this embodiment is received in the form of a payoff table using the front-end interface 124. A payoff table specifies the leader payoff and the follower payoff for each combination of a leader action and a follower action. In this embodiment, the payoff table that is received using the front-end interface 124 specifies the payoff to the defender and the payoff to the attacker for each combination of a convoy path and a location for an attack on the convoy.

For example, for the example leader-follower game described above in connection with Table 1, the payoff table shown in Table 1 is converted into the normal form Stackelberg game as shown above in connection with Equation (1).

Method 200 further comprises formulating a linear programming (LP) problem for each possible follower action (block 204). For each possible follower action (also referred to here as the "provoked follower action"), a respective LP problem is formulated that is to be solved by optimizing the leader payoff for a given mixed leader strategy and a given fixed follower action over a feasible region that includes only mixed leader strategies that provoke that provoked follower action. Each such LP problem is formulated by specifying an objective function that expresses the leader payoff for a given mixed leader strategy and the provoked follower action and by specifying a constraint that requires the follower payoff for a given mixed leader strategy and the provoked follower action to be greater than or equal to the follower payoff for that given mixed leader strategy and every other possible follower action.

In the particular embodiment described here in connection with FIGS. 1 and 2, the enumerated LP module 128 formulate each such LP problem from the payoff table received via the front-end interface 124. The objective function for each such LP problem is formulated as follows:

$$\max_x \Sigma_i R_{ij} x_i \quad (17)$$

In other words, Equation (17) is formulated as a polynomial including a term for each leader action in a given mixed leader strategy that is the product of the leader payoff $R_{ij}$ corresponding to the combination of that leader action and the provoked follower action and a variable that is the fraction $x_i$ of occasions that that leader action is to occur in the given mixed leader strategy.

The constraints for each such LP problem are formulated as follows:

$$\forall j \Sigma_i c_{ij} x_i \leq \Sigma_i c_{ij} x_i \quad (18)$$

$$\Sigma_i x_i = 1 \quad (19)$$

$$\forall i\, 0 \leq x_i \quad (20)$$

In other words, Equation (18) requires the follower payoff for a given mixed leader strategy and the provoked follower action to be greater than or equal to the follower payoff for that given mixed leader strategy and every other possible follower action.

Equation (19) requires the sum of all the fractions of occasions that the leader actions in the given mixed leader strategy are to occur equals 1.

Equation (20) requires that, for each leader action in a given mixed leader strategy, the fraction of occasions that that leader action is to occur is not negative.

Method 200 further comprises solving each of the set of LP problems (block 206). Because each of the set of LP problems is a polynomial LP problem, conventional LP algorithms and techniques can be used to solve such LP problems in a reasonable amount of time for real world applications.

Method 200 further comprises selecting an overall optimal mixed leader strategy from the optimal mixed leader strategies determined by solving the set of enumerated LP problems (block 208). The particular optimal mixed leader strategy that has the highest payoff to the leader is selected.

In the particular embodiment described here in connection with FIGS. 1 and 2, the enumerated LP module 128 solves each of the set of LP problems and selects the overall optimal mixed leader strategy from the set of optimal mixed leader strategies that result from solving the set of LP problems.

Method 200 further comprises generating an output derived from the optimal mixed leader strategies determined by solving the LP problems (block 210) and outputting the output by the changing a physical state associated with an interface (block 212). In the particular embodiment described here in connection with FIGS. 1 and 2, the schedule generator 130 generates a suggested convoy schedule from the front end's knowledge of the defense resources 102 and the security environment 104 combined with the optimal mixed leader strategy output by enumerated LP module 128. As noted above, the suggest convoy schedule is, for example, displayed on display device 120 and/or communicated via an appropriate interface 116 in the system 100 to a system or device within the defense resources 102 (via an interface 134 included therein).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of solving a leader-follower problem, the method comprising:
   receiving, with a programmable processor, an expression of the leader-follower problem as a normal form Stackelberg game;
   solving, with the programmable processor, an enumerated linear program (LP) problem, wherein solving the enumerated LP program comprises:
      determining a respective mixed leader strategy for each possible follower action of the normal form Stackelberg game, and
      optimizing a leader payoff for a given mixed leader strategy of the determined mixed leader strategies and a given fixed follower action over a feasible region that includes only mixed leader strategies that provoke the given fixed follower action;
   generating, with the programmable processor, an output derived from optimization of the leader payoff for the given mixed leader strategy and the given fixed follower action over the feasible region; and
   outputting, with the programmable processor, the output by changing a physical state associated with an interface.

2. The method of claim 1, further comprising selecting the given mixed leader strategy as an optimal mixed leader strategy from the determined mixed leader strategies based on the optimization of the leader payoff for the given mixed leader strategy and the given fixed follower action over the feasible region, wherein generating an output derived from optimization comprises generating an output indicative of the selected optimal mixed leader strategy.

3. The method of claim 1, wherein the enumerated LP problem comprises:
   an objective function that expresses the leader payoff for each possible follower action and the determined respective mixed leader strategy, and
   a constraint that requires a follower payoff for the given mixed leader strategy and the given fixed follower action to be greater than or equal to a follower payoff for the given mixed leader strategy and every other possible follower action.

4. The method of claim 1, wherein receiving the expression of the leader-follower problem as a normal form Stackelberg game comprises receiving a reward matrix that specifies a leader payoff and a follower payoff for a given leader action and a given follower action.

5. The method of claim 1, wherein the leader-follower problem comprises a defender-attacker game in which the leader comprises the defender and the follower comprises the attacker.

6. The method of claim 1, further comprising defending at least one of an electric power grid, a subway, an airport, and a convoy based on the output.

7. The method of claim 1, wherein, in the leader-follower problem, the leader has a set of leader actions and the follower has a set of follower actions, and wherein each leader action comprises movement along a convoy path that specifies a set of locations that a convoy travels and each follower action specifies movement to a particular location of the set of locations to attack at the particular location.

8. The method of claim 1, wherein, in the leader-follower problem, the leader has a set of leader actions and the follower has a set of follower actions, and wherein each mixed leader strategy comprises, for each particular leader action of the set of leader actions, a fraction of occasions that the leader chooses the particular leader action.

9. A system for solving a leader-follower problem, the system comprising:
   at least one programmable processor;
   at least one interface, wherein the at least one programmable processor is configured to receive information about the leader-follower problem via the at least one interface,
   wherein the at least one programmable processor is configured to:
      receive an expression of the leader-follower problem as a normal form Stackelberg game;
      solve an enumerated linear program (LP) problem, wherein the at least one programmable processor solves the enumerated LP program by at least:
         determining a respective mixed leader strategy for each possible follower action of the normal form Stackelberg game, and
         optimizing a leader payoff for a given mixed leader strategy of the determined mixed leader strategies and a given fixed follower action over a feasible region that includes only mixed leader strategies that provoke that respective the given fixed follower action,
      generate an output derived from the optimization of the leader payoff for the given mixed leader strategy and the given fixed follower action over the feasible region, and
      output the output by changing a physical state associated with the interface.

10. The system of claim 9, wherein the at least one programmable processor is further configured to select the given mixed leader strategy as an optimal mixed leader strategy from the determined mixed leader strategies based on the optimization of the leader payoff for the given mixed leader strategy and the given fixed follower action over the feasible region, wherein generating an output derived from optimization comprises generating an output indicative of the selected optimal mixed leader strategy.

11. The system of claim 9, wherein the enumerated LP problem comprises:
   an objective function that expresses the leader payoff for each possible follower action and the determined respective mixed leader strategy, and
   a constraint that requires a follower payoff for the given mixed leader strategy and the given fixed follower action to be greater than or equal to a follower payoff for the given mixed leader strategy and every other possible follower action.

12. The system of claim 9, wherein the at least one programmable processor receives the expression of the leader-follower problem as a normal form Stackelberg game by receiving a reward matrix that specifies a leader payoff and a follower payoff for a given leader action and a given follower action.

13. The system of claim 9, wherein the leader-follower problem comprises a defender-attacker game in which the leader comprises the defender and the follower comprises the attacker.

14. The system of claim 9, wherein the at least one programmable processor is configured to execute software, wherein the software comprises a front end and back end,
   wherein the front end comprises a front-end interface configured to receive a reward payoff that comprises the expression of the leader-follower problem as the normal form Stackelberg game, and wherein the back end comprises an enumerated LP module to solve the LP problem for each possible follower action.

15. The system of claim 9, wherein the at least one interface comprises:
   a first interface configured to communicatively couple the system to an input device, and
   a second interface configured to communicatively couple the system to a display device, wherein the at least one programmable processor changes the physical state associated with the at least one interface by at least displaying a portion of the output on the display device.

16. A program product for solving a leader-follower problem, the program-product comprising a non-transitory processor-readable medium on which program instructions are embodied, wherein the program instructions are operable, when executed by at least one programmable processor included in a device, to cause the device to:
   receive an expression of the leader-follower problem as a normal form Stackelberg game;
   solve an enumerated linear program (LP) problem, wherein solving the enumerated LP problem comprises:
      determining a respective mixed leader strategy for each possible follower action of the normal form Stackelberg game, and
      optimizing a leader payoff for a given mixed leader strategy of the determined mixed leader strategies and a given fixed follower action over a feasible region that includes only mixed leader strategies that provoke the given fixed follower action;
   generate an output derived from the optimization of the leader payoff for the given mixed leader strategy and the given fixed follower action over the feasible region; and
   output the output by changing a physical state associated with an interface.

17. The program product of claim 16, wherein the program instructions are further operable, when executed by at least one programmable processor included in a device, to cause the device to select the given mixed leader strategy as an optimal mixed leader strategy from the determined mixed leader strategies based on the optimization of the leader payoff for the given mixed leader strategy and the given fixed follower action over the feasible region, wherein the program instructions cause the device to generate an output generating an output derived from optimization by at least generating an output indicative of the selected optimal mixed leader strategy.

18. The program product of claim 16, wherein the enumerated LP problem comprises:
   an objective function that expresses the leader payoff for each possible follower action and the determined respective mixed leader strategy, and
   a constraint that requires a follower payoff for the given mixed leader strategy and the given fixed follower action to be greater than or equal to a follower payoff for the given mixed leader strategy and every other possible follower action.

19. The program product of claim 16, wherein the program instructions are further operable, when executed by the at least one programmable processor included in the device, to cause the device to receive the expression of the leader-follower problem as a normal form Stackelberg game by receiving a reward matrix that specifies a leader payoff and a follower payoff for a given leader action and a given follower action.

20. The program product of claim 16, wherein the leader-follower problem comprises a defender-attacker game in which the leader comprises the defender and the follower comprises the attacker.

* * * * *

UNITED STATES PATENT AND TRADEMARK OFFICE
CERTIFICATE OF CORRECTION

| | | |
|---|---|---|
| PATENT NO. | : 8,108,188 B2 | Page 1 of 1 |
| APPLICATION NO. | : 12/261616 | |
| DATED | : January 31, 2012 | |
| INVENTOR(S) | : Johnson | |

It is certified that error appears in the above-identified patent and that said Letters Patent is hereby corrected as shown below:

Column 12, line 23, delete "that respective".

Signed and Sealed this
Nineteenth Day of June, 2012

David J. Kappos
*Director of the United States Patent and Trademark Office*